(12) United States Patent
Sakamaki

(10) Patent No.: US 7,640,828 B2
(45) Date of Patent: Jan. 5, 2010

(54) SEAT DRIVE MOTOR AND POWER SEAT SYSTEM

(75) Inventor: Ryousuke Sakamaki, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 844 days.

(21) Appl. No.: 10/984,751

(22) Filed: Nov. 10, 2004

(65) Prior Publication Data
US 2005/0116132 A1 Jun. 2, 2005

(30) Foreign Application Priority Data
Nov. 28, 2003 (JP) .............................. 2003-399571
Oct. 13, 2004 (JP) .............................. 2004-298962

(51) Int. Cl.
F16H 1/16 (2006.01)
F16H 1/20 (2006.01)
F16H 57/02 (2006.01)
B60N 2/02 (2006.01)
B60N 2/48 (2006.01)

(52) U.S. Cl. .................. 74/606 R; 74/425; 297/362.14; 297/344.17

(58) Field of Classification Search ............... 74/606 R, 74/89.14, 409, 396, 425; 310/89, 68 B; 248/424; 297/362.14, 344.17; 29/893.1; B60N 2/06, B60N 2/44
See application file for complete search history.

(56) References Cited

U.S. PATENT DOCUMENTS 4,790,202 A * 12/1988 Hayashi et al. ............... 74/396
5,144,849 A * 9/1992 Aihara et al. ............... 74/89.14
5,836,076 A * 11/1998 Duta et al. .................. 29/893.1
6,091,171 A * 7/2000 Ohishi et al. ............... 310/68 B
6,352,006 B1 * 3/2002 Kurashita ..................... 74/409
6,963,152 B2 * 11/2005 Gotou .......................... 310/89
7,275,791 B2 * 10/2007 Sakamaki .............. 297/362.14

FOREIGN PATENT DOCUMENTS

EP        1 710 118 A2 * 10/2006 ................. 248/424
JP            U-5-3022         1/1993
JP            A-8-40119        2/1996
WO     WO 2004/078516 A1 *  9/2004

OTHER PUBLICATIONS

English machine translation of JP 08-040119 A (1966), AIPN, Oct. 22, 2008.*
English machine translation of JP 05-003022 U (1993), AIPN, Oct. 22, 2008.*
PTO 09-4764, English Translation of JP 08040119, Inventor: Ito Sadao, Feb. 13, 1996.*
Office Action dated Nov. 23, 2007 in corresponding Chinese Patent Application No. 200410092595.4 (and English translation).

* cited by examiner

Primary Examiner—Vinh T. Luong
(74) Attorney, Agent, or Firm—Posz Law Group, PLC

(57) ABSTRACT

A housing is held by a bracket of a vehicle seat and receives a worm wheel and a threaded shaft. The shaft is driven linearly through the worm wheel. One end of the housing contacts the bracket and includes a receiving recess, which is recessed in the axial direction of the worm wheel. A sensor unit is installed in the recess of the one end of the housing and includes a support wall, which supports the housing relative to the bracket in the axial direction of the worm wheel.

16 Claims, 16 Drawing Sheets

SEAT DRIVE MOTOR AND POWER SEAT SYSTEM

CROSS REFERENCE TO RELATED APPLICATION

This application is based on and incorporates herein by reference Japanese Patent Application No. 2003-399571 filed on Nov. 28, 2003 and Japanese Patent Application No. 2004-298962 filed on Oct. 13, 2004. This application is also related to U.S. Pat. No. 7,275,791 issued on Oct. 2, 2007 (application Ser. No. 10/984,806 filed on Nov. 10, 2004), entitled "SEAT DRIVE MOTOR AND POWER SEAT SYSTEM."

BACKGROUND OF THE INVENTION

1. Field of the Invention

The present invention relates to a seat drive motor and a power seat system having the same. More particularly, the present invention relates to a seat drive motor, which includes a housing installed in a vehicle seat through a bracket, and also relates to a power seat system having the same.

2. Description of Related Art

For example, Japanese Unexamined Patent Publication No. H8-40119 discloses a lift mechanism of a vehicle power seat system. In the lift mechanism, a seat drive motor, which has a speed reducing mechanism, drives a threaded shaft to linearly and axially move the threaded shaft in a forward or backward direction. When the threaded shaft is moved in the forward or backward direction, a link member, which is connected to one end of the threaded shaft, is pivoted to vertically move a vehicle seat, which is connected to the link member, in an upward or downward direction. The speed reducing mechanism includes a worm and a worm wheel, which are received in a gear housing of the motor. The worm is secured to a rotatable shaft (a drive shaft) of the motor, and the worm wheel is meshed with the worm. A threaded hole penetrates through the worm wheel in an axial direction of the worm wheel. Threads of the threaded shaft are engaged with threads of the threaded hole of the worm wheel. When the worm wheel is rotated by the motor, the threaded shaft is axially moved in the forward or backward direction. One such power seat system has a rotation sensor, which is installed in the gear housing of the motor and measures revolutions per minute (rpm), i.e., a rotational speed of the worm wheel.

When the power seat system has the above structure, in which the rotation sensor for measuring the rpm of the worm wheel is provided in an interior of the gear housing of the motor, it is difficult to install the rotation sensor in the interior of the gear housing at the time of assembling the motor.

In order to ease the installation of the rotation sensor to the gear housing, for example, Japanese Unexamined Utility Model Publication No. 5-3022 teaches provision of the rotation sensor at an outer side of the gear housing of the motor. In one such seat drive motor, one end portion of the gear housing, which extends in a direction perpendicular to the rotational axis of the worm wheel, engages a bracket, and a recess is formed in the end portion of the gear housing, which extends perpendicular to the rotational axis of the worm wheel. The rotation sensor, which measures the rpm of the worm wheel, is arranged in this recess.

However, in the above seat drive motor, at the time of driving the motor, a thrust force of the worm wheel is repeatedly applied to the portion of the gear housing, to which the rotation sensor is provided. Thus, the portion of the gear housing, to which the rotation sensor is provided, is flexed and is deformed by the thrust force. This causes a short lifetime of the gear housing. To address the above disadvantage, it is required to increase a wall thickness of the portion of the gear housing, to which the rotation sensor is provided. When the wall thickness of the gear housing is increased to reinforce the gear housing, a weight of the gear housing is disadvantageously increased, and a size of the gear housing is also disadvantageously increased. Also, this results in an increase in material costs of the gear housing.

SUMMARY OF THE INVENTION

The present invention addresses the above disadvantages. Thus, it is an objective of the present invention to provide a seat drive motor, which permits an increase in a lifetime of a housing of the seat drive motor. It is another objective of the present invention to provide a power seat system having such a seat drive motor. It is a further objective of the present invention to provide a seat drive motor, which permits a reduction in a size of a housing of the seat drive motor, a reduction in a weight of the housing and a reduction in material costs of the gear housing. It is another objective of the present invention to provide a power seat system having such a seat drive motor.

To achieve the objectives of the present invention, there is provided a seat drive motor, which includes a bracket, a housing, a space member and a motor unit. The housing is held by the bracket and receives a rotatable member and a linearly movable member. The linearly movable member is driven linearly through the rotatable member. One end of the housing contacts the bracket and includes a receiving recess, which is recessed in the axial direction of the rotatable member. The space member is installed in the receiving recess of the one end of the housing and includes a support portion, which supports the housing relative to the bracket in the axial direction of the rotatable member. The motor unit drives the rotatable member.

To achieve the objectives of the present invention, there is also provided a power seat system, which includes the above seat drive motor and a vehicle seat driven by the seat drive motor.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings. It should be understood that the following components and arrangement thereof are not intended to limit the present invention and can be modified without departing from the scope of the present invention.

A structure of a seat drive motor of the present embodiment will be described with reference to FIGS. 1 to 13. Numeral 1 shown in FIG. 1 designates the seat drive motor of the present embodiment. The seat drive motor 1 is suitable for, for example, a lift mechanism of a power seat system S (FIGS. 16 and 17) described later and includes an electric motor unit 10, a speed reducing mechanism 20, a resin gear housing (a housing of the present invention) 30 and a sensor unit (a space member of the present invention) 40.

Figure 1:
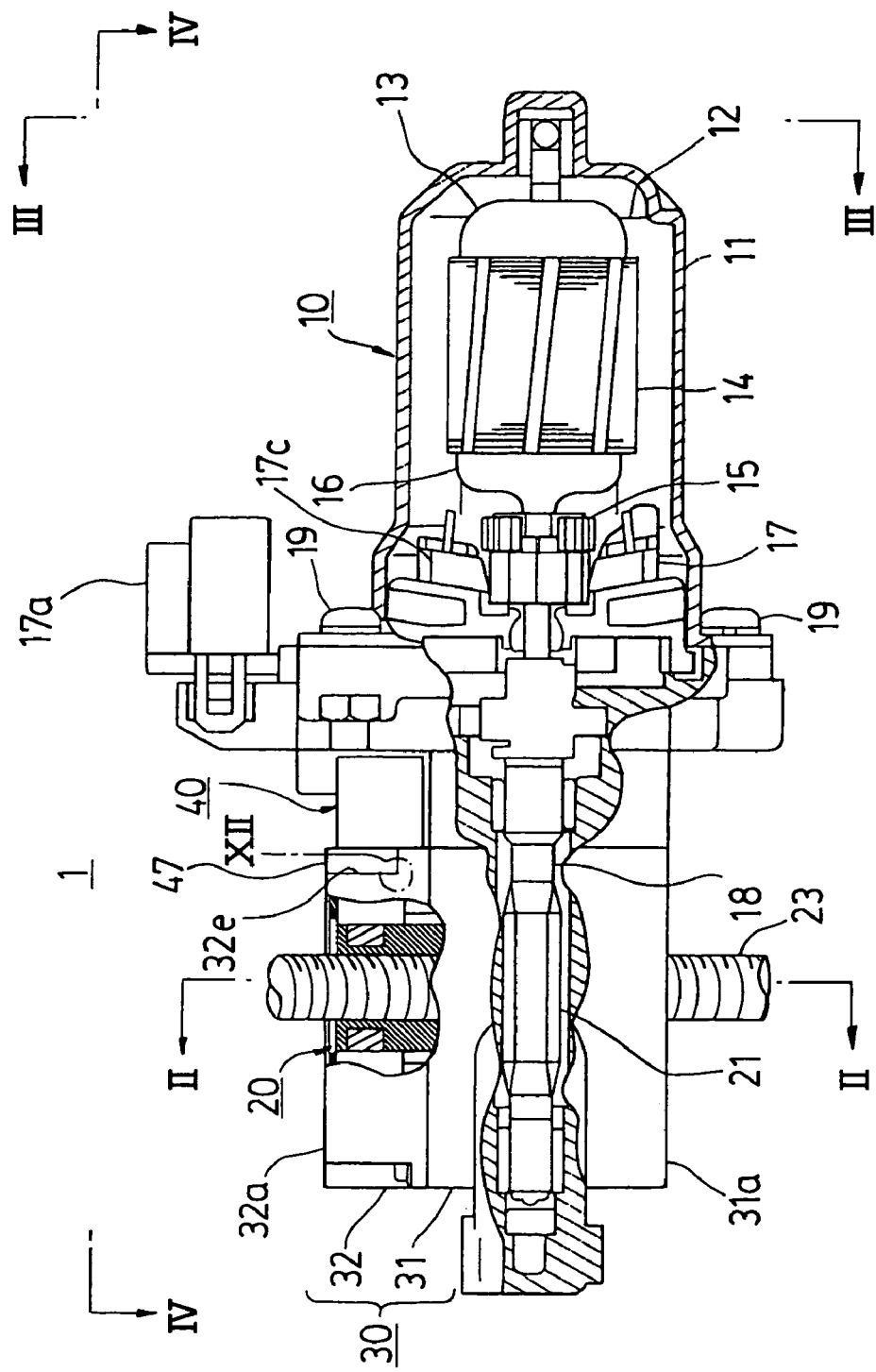
FIG. 1 is a partially fragmented side view of a seat drive motor according to an embodiment of the present invention.
Figure 3:
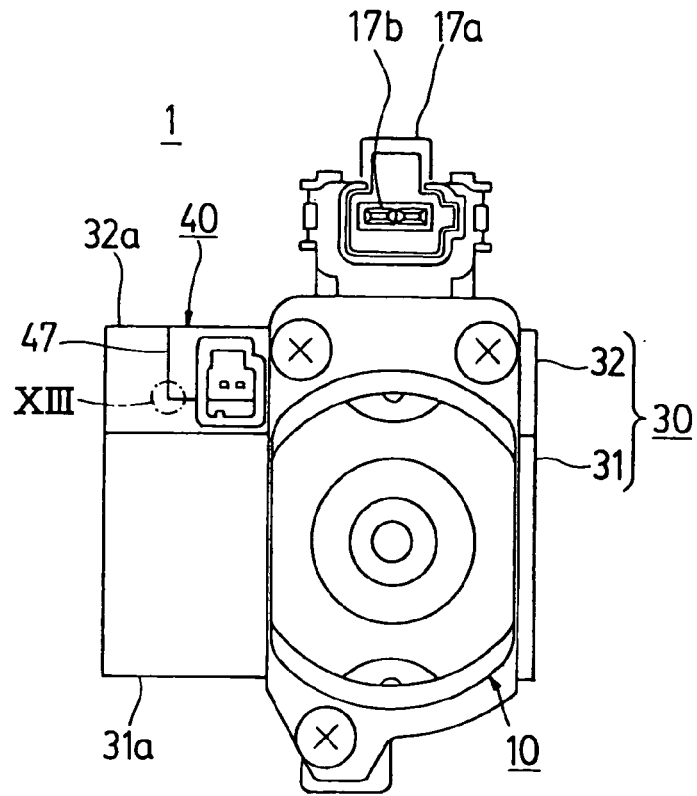
FIG. 3 is an end view along line III-III in FIG. 1.

With reference to FIG. 1, the motor unit 10 is made of a direct current (DC) brush motor and is connected to the gear housing 30 by screws 19. In the motor unit 10 of the present embodiment, magnets 12 are arranged inside a yoke housing 11, and an armature 13 is supported radially inward of the magnets 12 in a rotatable manner. The armature 13 includes a core 14 and a commutator 15. Coils 16 are wound around the core 14. Ends of the coils 16, which are wound around the core 14, are connected to the commutator 15. As shown in FIGS. 1 and 3, the motor unit 10 includes a brush holder 17. A power supply connector 17a is formed integrally in the brush holder 17. Power supply terminals 17b are provided in the power supply connector 17a. The power supply terminals 17b are electrically connected to brushes 17c provided in the brush holder 17.

Figure 2:
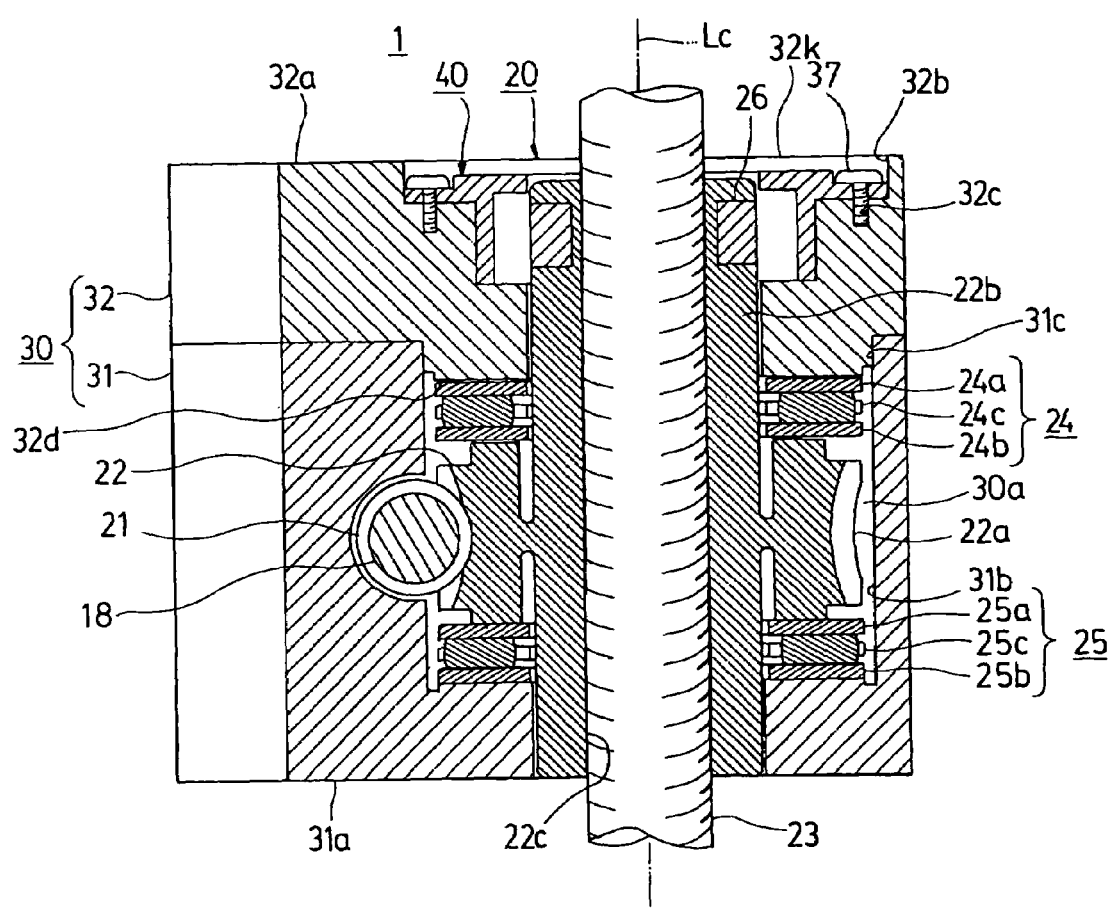
FIG. 2 is an enlarged cross sectional view along line II-II in FIG. 1.

With reference to FIGS. 1 and 2, the speed reducing mechanism 20 reduces a rotational speed of the motor unit 10 and includes a worm 21, a worm wheel (a rotatable member of the present invention) 22 and a threaded shaft 23 (a linearly movable member of the present invention). The worm 21 is formed in a free end of a rotatable shaft (a drive shaft) 18, which is provided in the armature 13, so that the worm 21 rotates integrally with the armature 13. As shown in FIG. 2, the worm wheel 22 is coaxial with the threaded shaft 23 and includes a disk shaped gear part 22a and a cylindrical extension 22b. The gear part 22a includes teeth, which are arranged at generally equal intervals in a circumferential direction. The extension 22b extends parallel to a rotational axis Lc in both upward and downward directions from the gear part 22a. The gear part 22a is meshed with the worm 21 and is rotatably supported between thrust bearing members 24, 25 in a space 30a, which is formed in the gear housing 30. With this arrangement, when the worm 21 rotates, the worm wheel 22 rotates about the rotational axis Lc.

The bearing member 24 includes two washers 24a, 24b and a bearing 24c. Similarly, the bearing member 25 includes two washers 25a, 25b and a bearing 25c. A shaft receiving hole 22c extends axially through the extension 22b. Female threads are formed in an inner wall of the shaft receiving hole 22c to threadably engage male threads of the threaded shaft 23. An annular sensor magnet 26 is arranged at an upper end (a second gear housing part 32 side end) of the extension 22b. The sensor magnet 26 includes a plurality of sets of N and S magnetic poles (e.g., two sets of N and S magnetic poles, i.e., two N magnetic poles and two S magnetic poles), which are arranged one after the other in a circumferential direction. The sensor magnet 26 rotates together with the worm wheel 22. Although in the present embodiment, the single annular magnet is used, a plurality of magnets may be provided one after another in the circumferential direction to form the sensor magnet (or a sensor magnet assembly) 26.

Figure 14:
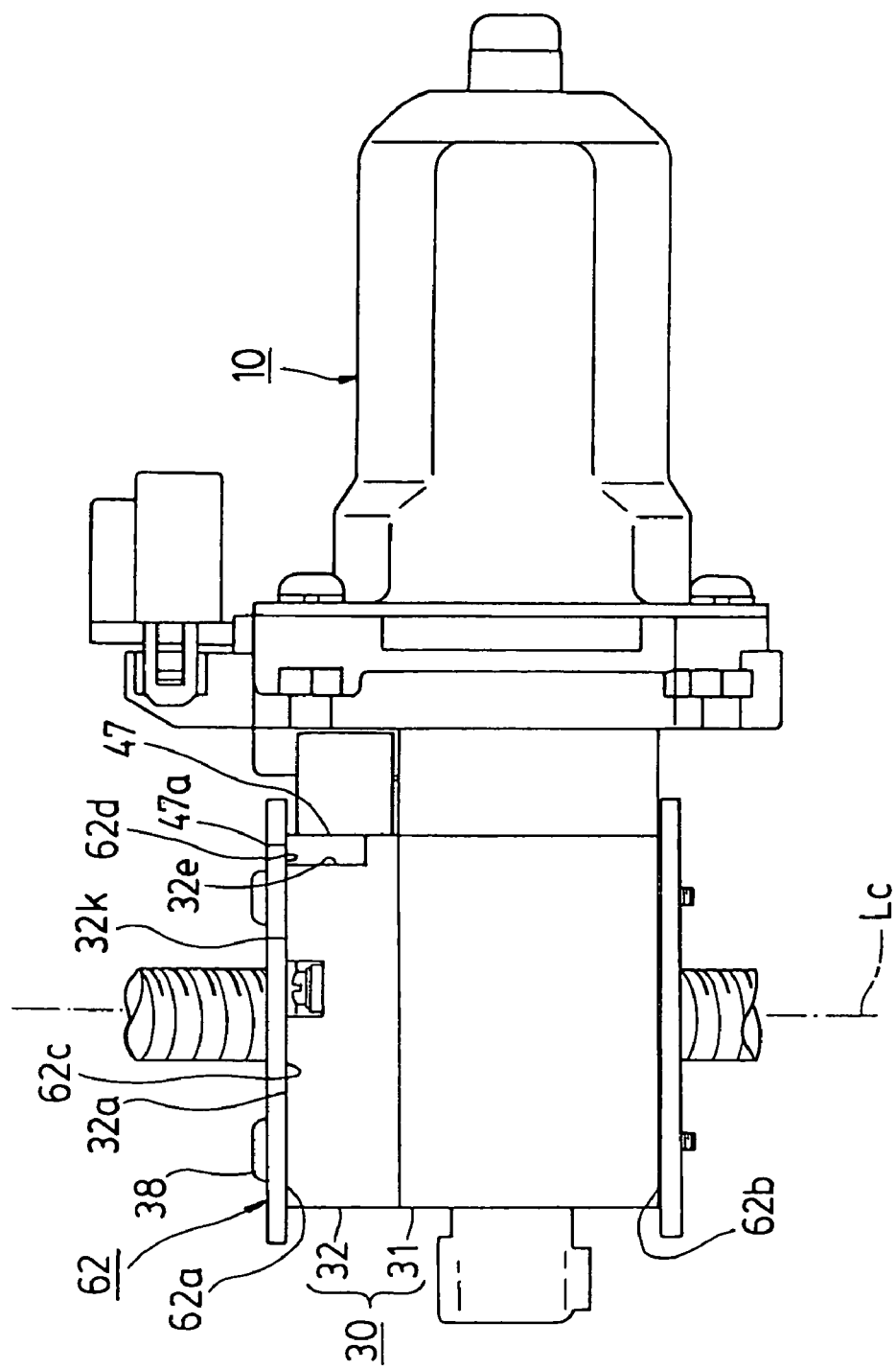
FIG. 14 is a side view of the seat drive motor, to which a holding bracket is installed.
Figure 15:
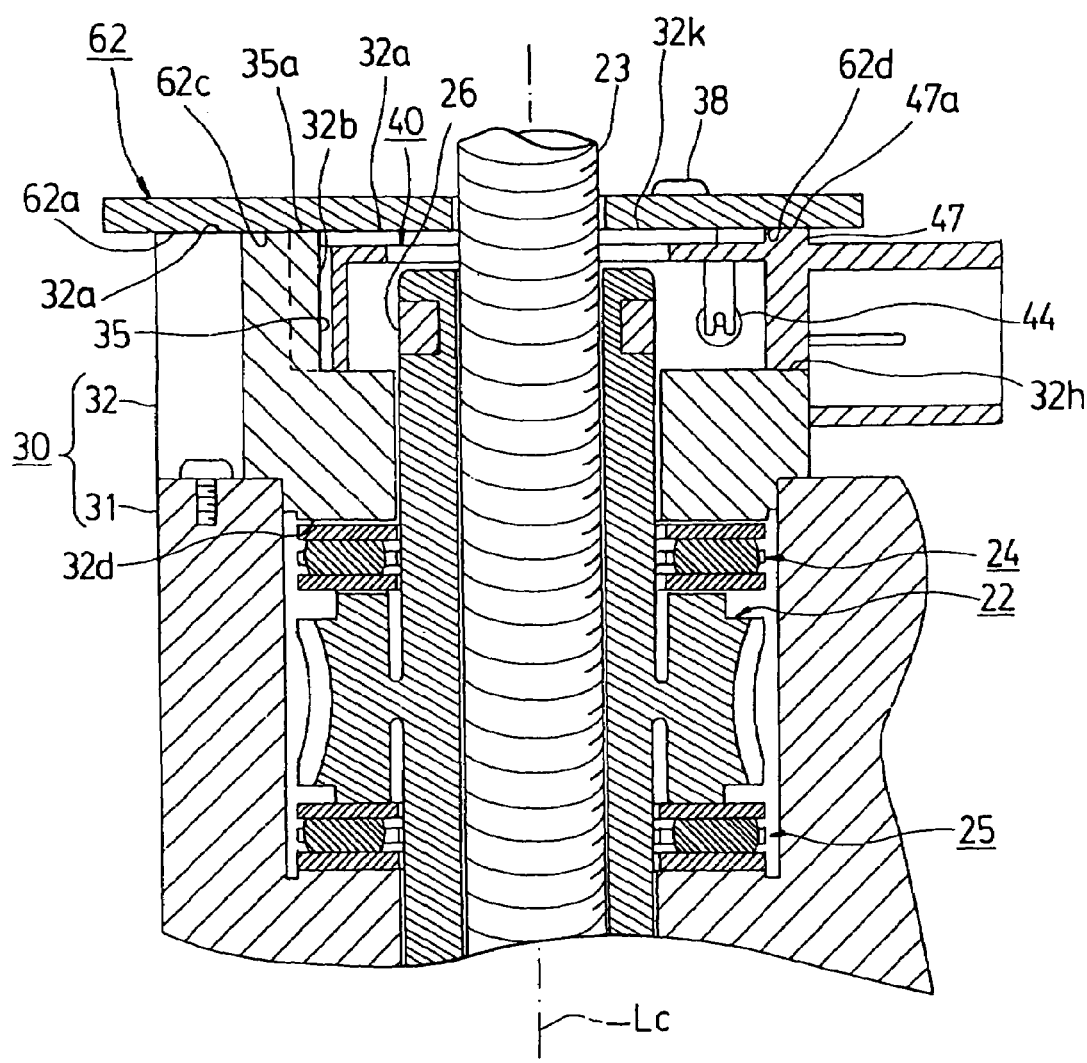
FIG. 15 is an enlarged partial cross sectional view of the seat drive motor, to which the holding bracket is installed.
Figure 16:
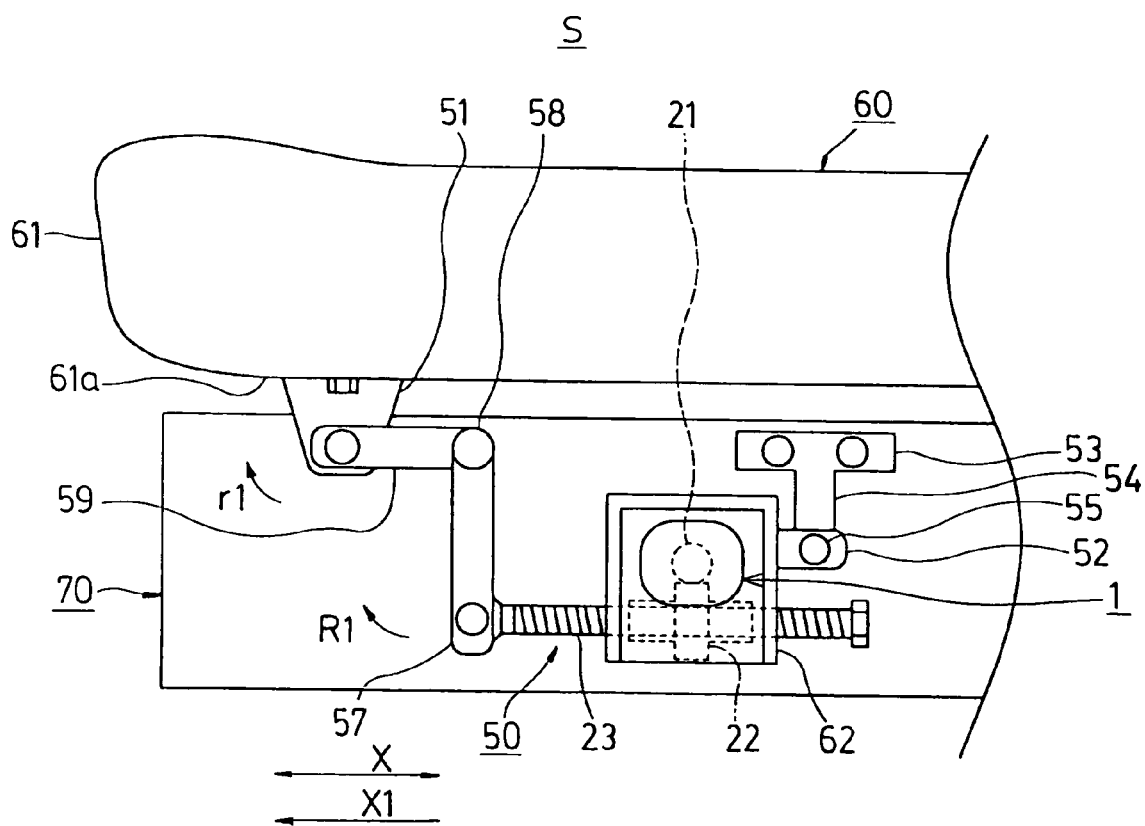
FIG. 16 is a partial schematic view of a power seat system of the present embodiment.

The gear housing 30 receives the speed reducing mechanism 20 and includes a first gear housing part 31 and a second gear housing part 32, as shown in FIGS. 1 to 3. As will be described later, when the seat drive motor 1 is installed to a vehicle seat 60, the gear housing 30 is clamped by a generally U-shaped bracket 62 that has two generally flat portions 62a, 62b, which are opposed to one another (FIGS. 14-16). Thus, an end portion 31a of the first gear housing part 31 and an end portion 32a of the second gear housing part 32 are made flat to stabilize connection between the gear housing 30 and the bracket 62. Here, the end portion 32a of the second gear housing part 32 is formed to extend perpendicular to the rotational axis Lc of the worm wheel 22 and serves as one end portion of the gear housing 30 of the present invention that extends perpendicular to the rotational axis of the rotatable member. It should be noted that even when the worm wheel 22 is made shorter in the axial direction, the end portion 32a of the present invention still extends perpendicular to the rotational axis Lc.

Figure 4:
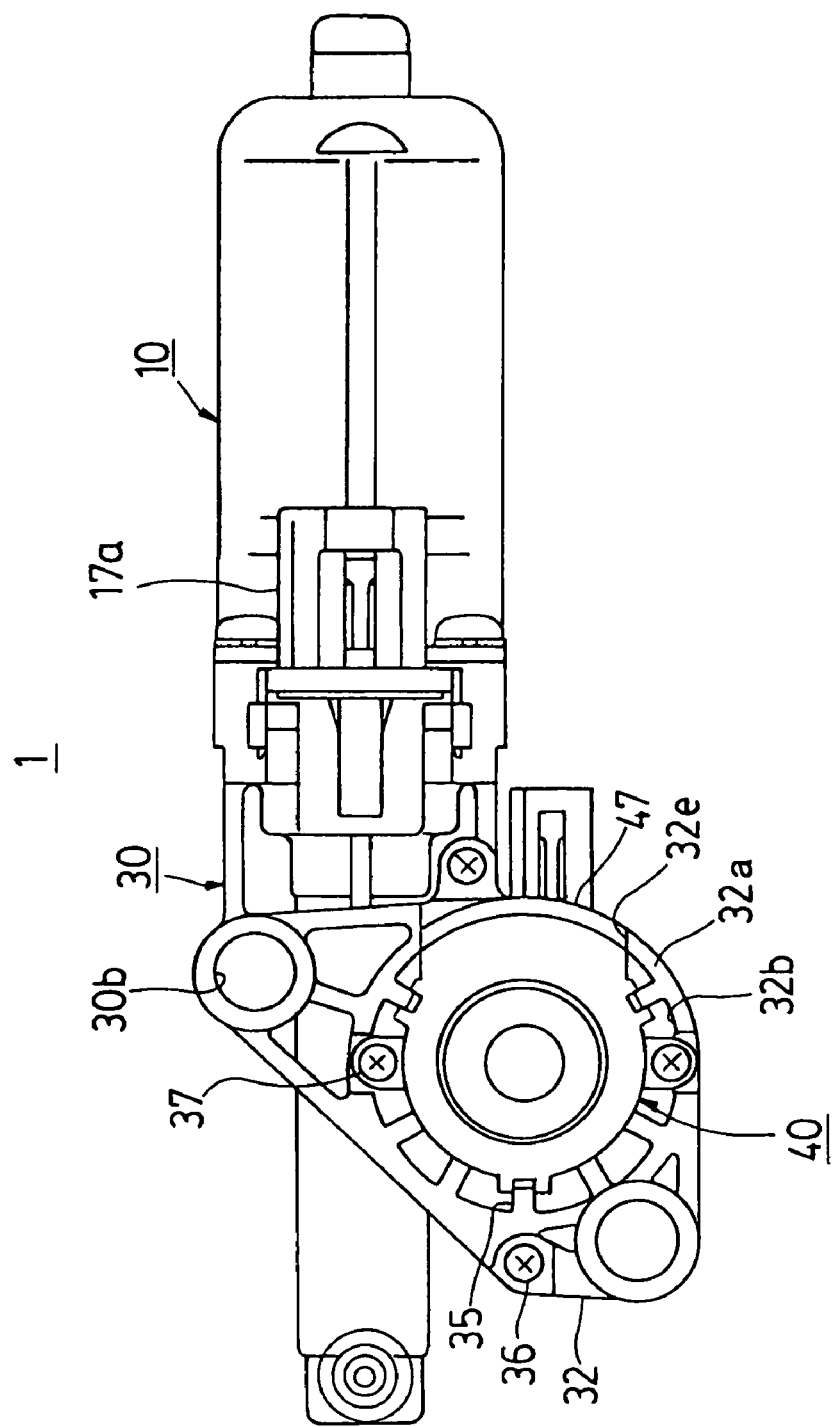
FIG. 4 is a plan view along line IV-IV in FIG. 1.

As shown in FIG. 4, the gear housing 30 includes bracket connection holes 30b. Screws 38 (FIG. 14) are inserted into the bracket connection holes 30b, respectively, through corresponding holes of the bracket 62 to connect the bracket 62 to the gear housing 30. As shown in FIG. 2, the first gear housing part 31 includes a recess 31b, which has an opening 31c on a side opposite from the end portion 31a. The gear part 22a and the bearing members 24, 25 are rotatably received in the recess 31b.

Figure 5:
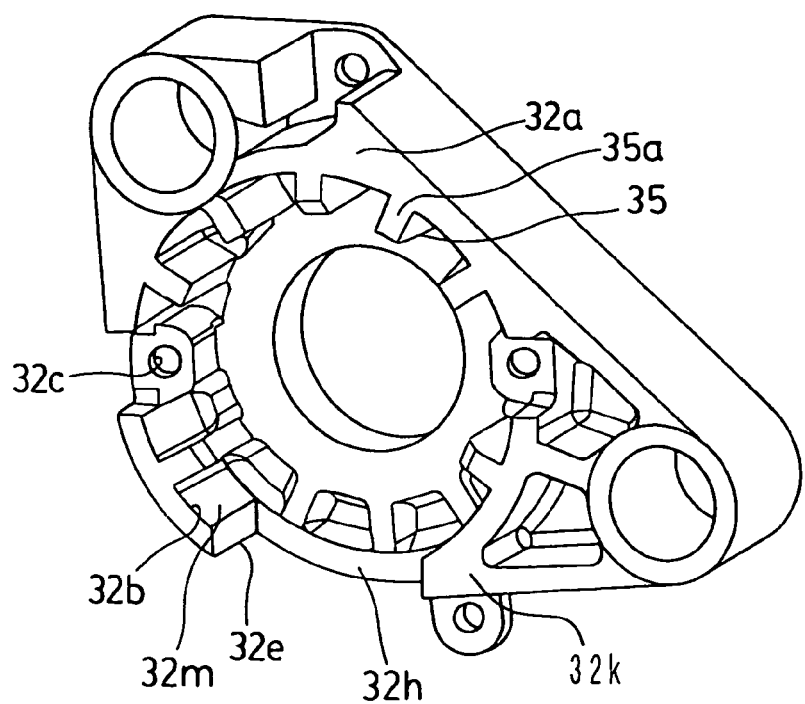
FIG. 5 is a front perspective view of a second gear housing part of the seat drive motor.

The second gear housing part 32 is constructed to close the opening 31c of the first gear housing part 31. The second gear housing part 32 is connected to the first gear housing part 31 by screws 36 (FIG. 4). Furthermore, as shown in FIG. 5, a receiving recess 32b is formed in the second gear housing part 32 to receive the sensor unit 40, which will be described in greater detail below. The receiving recess 32b is formed as a recess, which is surrounded by a peripheral wall 32m and has a circular opening in the end portion 32a. Screw holes 32c are formed at an outer peripheral part of the receiving recess 32b of the second gear housing part 32 to threadably connect the sensor unit 40 to the second gear housing part 32.

As shown in FIGS. 4 and 5, a plurality (seven in the present embodiment) of ribs 35 is provided in the receiving recess 32b to increase an axial strength of the second gear housing part 32. Each rib 35 extends in the axial direction of the receiving recess 32b and is formed as a ridge, which projects inwardly in the radial direction of the receiving recess 32b. An end surface 35a of the rib 35 is substantially flush with an end surface 32k of the end portion 32a of the second gear housing part 32.

Figure 6:
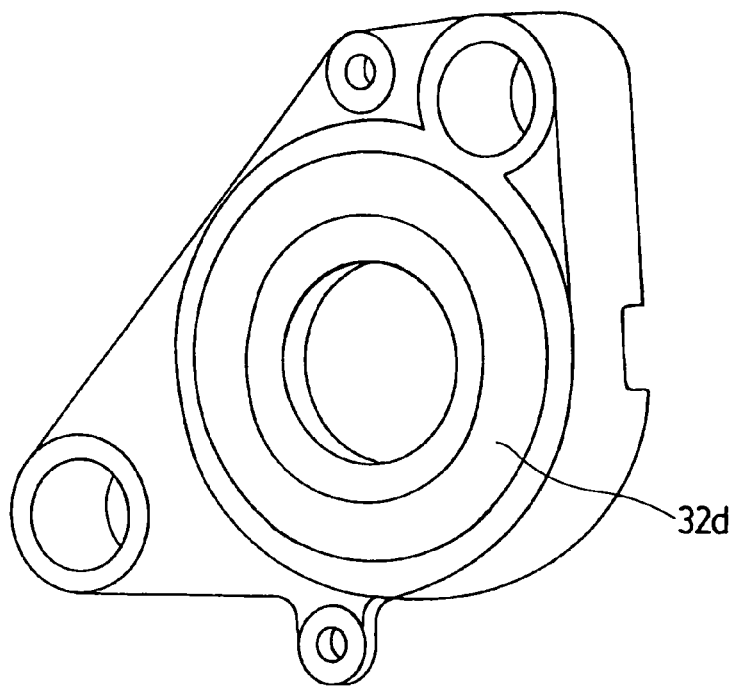
FIG. 6 is a rear perspective view of the second gear housing part of the seat drive motor.

The second gear housing part 32 of the present embodiment has a support surface 32d on a side (a first gear housing part 31 side) opposite from the ribs 35. The support surface 32d supports the gear part 22a of the worm wheel 22 and the bearing member 24 (FIGS. 2 and 6). The ribs 35 overlap with the support surface 32d in the axial direction of the rotational axis Lc of the worm wheel 22 in such a manner that the ribs 35 effectively receive a thrust force even when the support surface 32d receives the thrust force from the worm wheel 22.

As shown in FIG. 5, a portion of the peripheral wall 32m of the recess 32b is axially recessed to form a notch or groove 32e that radially extends through the peripheral wall 32m of the recess 32b. A terminal plate 43 is arranged in the groove 32e to externally output a rotation measurement signal, i.e., a sensor signal. A support wall 47 (FIG. 7), which is formed in the sensor unit 40, is engaged with the groove 32e.

Figure 7:
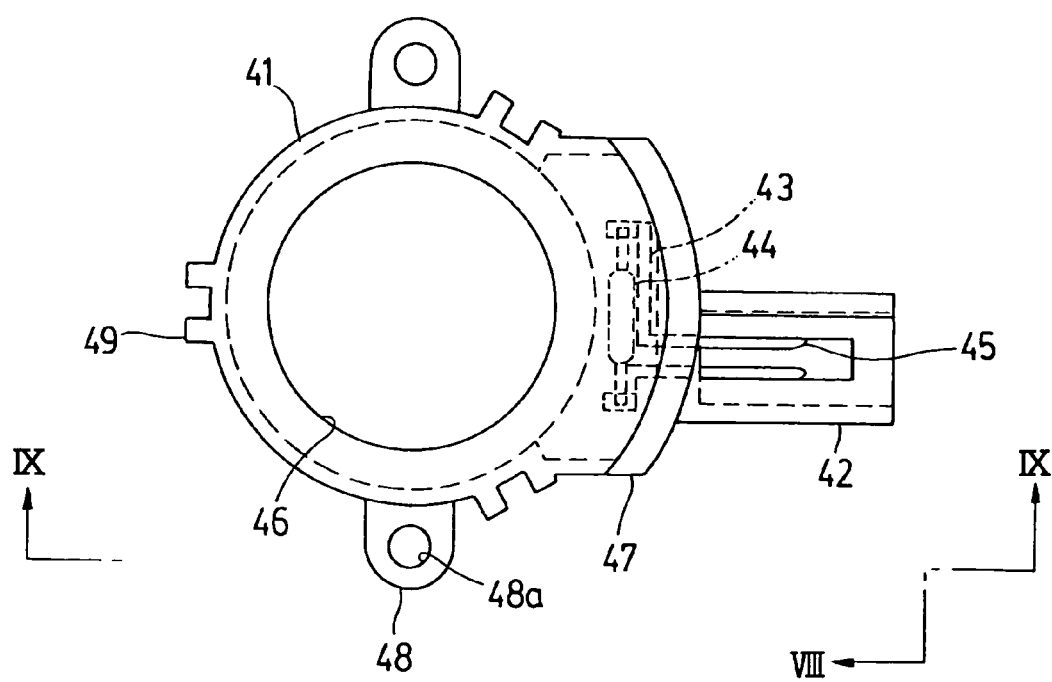
FIG. 7 is a plan view of a sensor unit of the seat drive motor.
Figure 8:
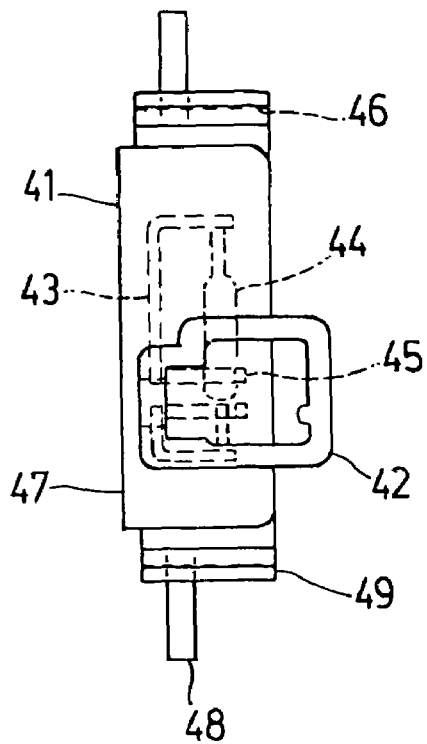
FIG. 8 is an end view along line VIII-VIII in FIG. 7.
Figure 9:
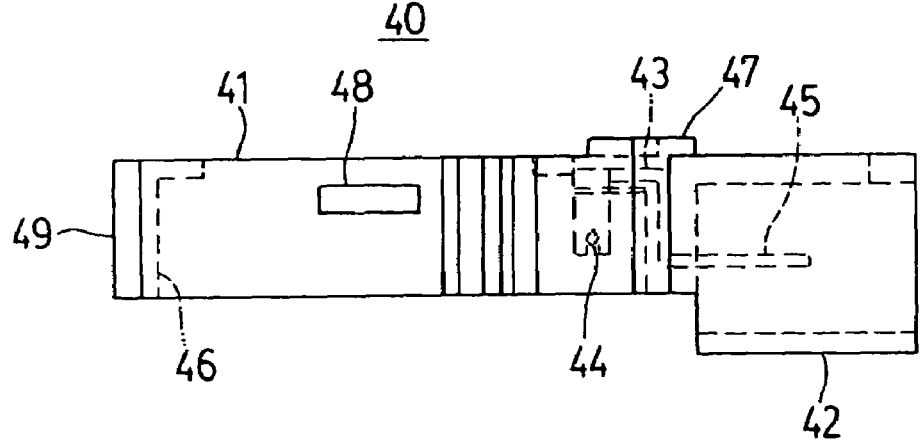
FIG. 9 is a side view along line IX-IX in FIG. 8.

As shown in FIGS. 7 to 9, the sensor unit 40 includes a unit main body 41 and a connector 42. The terminal plate 43 is provided in the unit main body 41. A rotation sensor or a rotation sensor element (e.g., a bimetal or a Hall element) 44, which generates electricity in response to a change in a magnetic force, is connected to an end of the terminal plate 43. Output terminals of the rotation sensor 44 are connected to connector terminals 45 (corresponding to a signal outputting means of the present invention) through the terminal plate 43. A through hole 46 is formed in a center of the unit main body 41 to receive the threaded shaft 23 therethrough. The support wall 47 (corresponding to a support portion of the present invention), which protrudes in the axial direction of the unit main body 41 and extends arcuately in a circumferential direction of the sensor unit 40, is provided at a connector 42 side of the unit main body 41.

Figure 10:
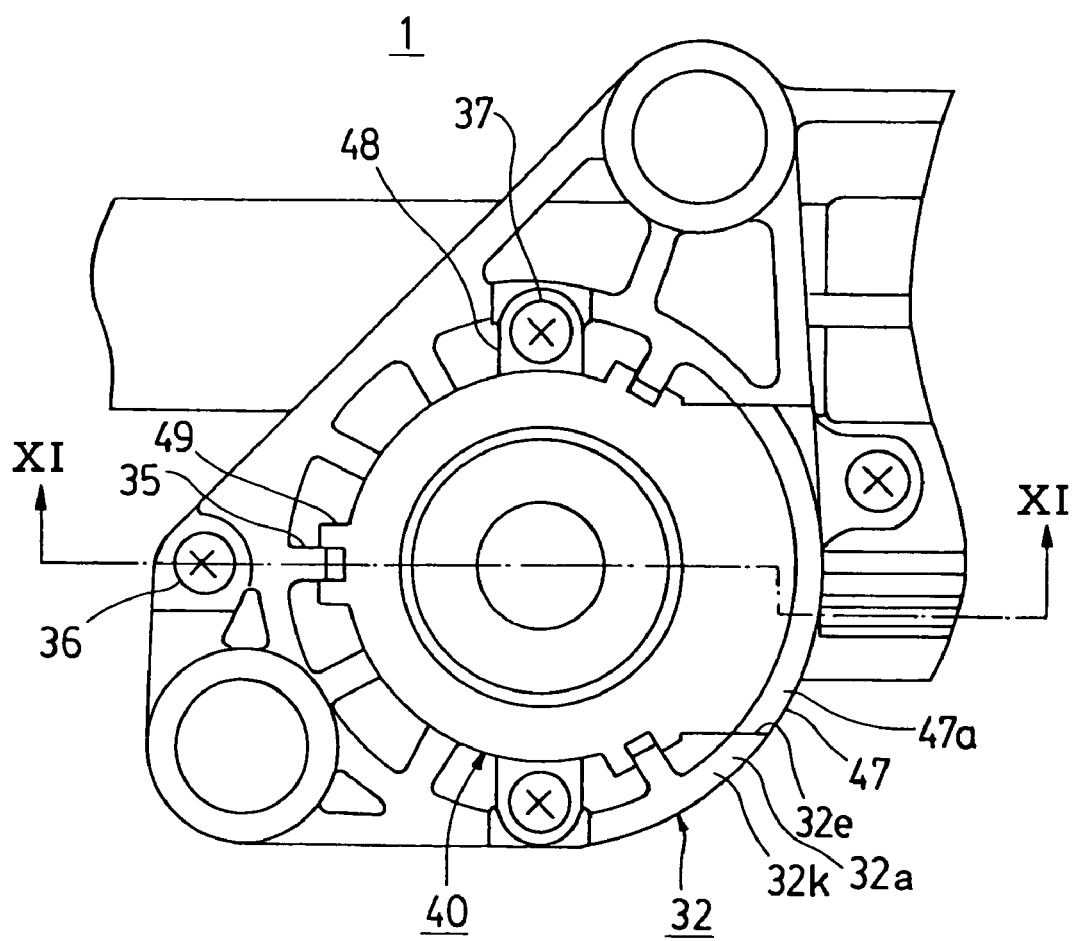
FIG. 10 is a partial plan view showing a portion of the seat drive motor around the sensor unit.
Figure 11:
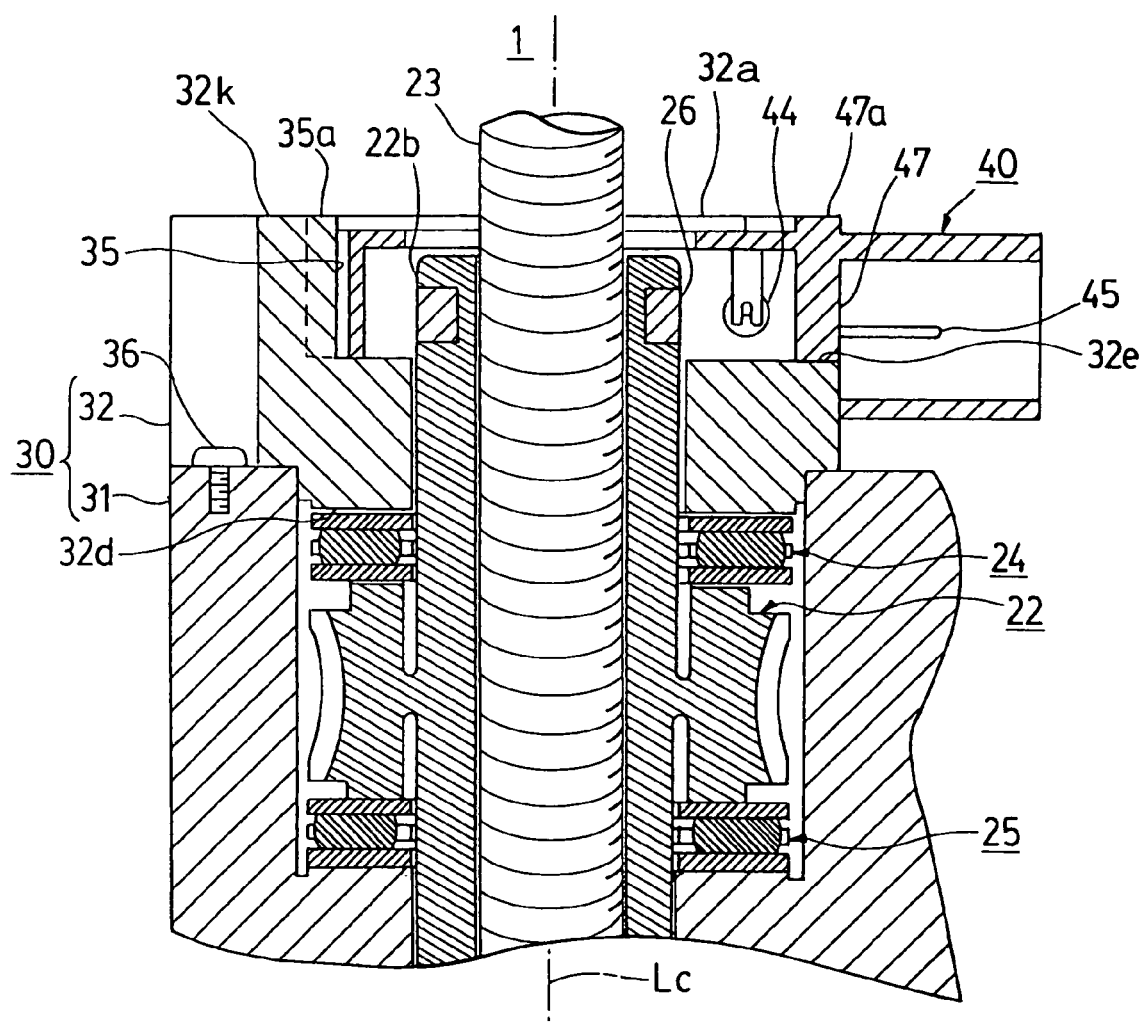
FIG. 11 is an enlarged cross sectional view taken along line XI-XI in FIG. 10.

The support wall 47 is engaged with the groove 32e of the second gear housing part 32 to increase an axial strength of the second gear housing part 32 (FIGS. 10 and 11). That is, in the seat drive motor 1 of the present embodiment, as described above, the groove 32e for outputting the signal is formed in the second gear housing part 32, and the groove 32e is reinforced by the support wall 47. The terminal plate 43 and the connector terminals 45 are integrated in the support wall 47 by insert molding.

Two connecting pieces 48 are formed in an outer peripheral part of the unit main body 41. A screw receiving hole 48a is formed in each connecting piece 48. A plurality (three in this case) of engaging portions 49 is formed in an outer peripheral part of the sensor unit 40, and each engaging portion 49 includes two ridges, which are parallel to one another. As shown in FIG. 10, predetermined ones of the ribs 35 (three of seven ribs) engage the engaging portions 49, respectively, so that the sensor unit 40 is positioned relative to the second gear housing part 32. In this state where the sensor unit 40 is positioned relative to the second gear housing part 32, screws 37 are threaded into the screw holes 32c of the second gear housing part 32 through the screw receiving holes 48a of the connecting pieces 48 of the sensor unit 40. Thus, the second gear housing part 32 and the sensor unit 40 are assembled together.

In this state where the sensor unit 40 is assembled to the second gear housing part 32, the extension 22b of the worm wheel 22 is arranged radially inward of the sensor unit 40 in such a manner that the rotation sensor 44 is radially opposed to the sensor magnet 26, as shown in FIG. 11. In the seat drive motor 1 of the present embodiment, upon rotation of the worm wheel 22, a change in the magnetic force of the sensor magnet 26 is sensed by the rotation sensor 44, and a pulse signal is externally outputted from the connector terminals 45 according to the change in the magnetic force of the sensor magnet 26.

As shown in FIGS. 10 and 11, when the sensor unit 40 is installed or is detachably installed to the second gear housing part 32, the support wall 47 is engaged with the groove 32e, and the end surface 47a of the support wall 47 is substantially flush with the end surface 32k of the end portion 32a of the second gear housing part 32. More specifically, the end surface 32k of the end portion 32a of the second gear housing part 32 and the end surface 47a of the support wall 47 are arranged in a common plane, which is perpendicular to the axial direction Lc of the worm wheel 22. In this way, the end surface 32k of the end portion 32a of the second gear housing part 32 and the end surface 47a of the support wall 47 substantially simultaneously contact the flat portion 62a of the bracket 62.

In other words, in the present embodiment, as shown in FIGS. 14 and 15, when a gear housing side contact surface 62c of the bracket 62, which is opposed to the end surface 32k of the end portion 32a of the second gear housing part 32, contacts the end surface 32k of the end portion 32a of the second gear housing part 32, a support wall side contact surface 62d of the bracket 62, which is opposed to the end surface 47a of the support wall 47, contacts the end surface 47a of the support wall 47. Furthermore, in the present embodiment, the gear housing side contact surface 62c of the bracket 62, which is opposed to the end surface 32k of the end portion 32a of the second gear housing part 32, and the support wall side contact surface 62d of the bracket 62, which is opposed to the end surface 47a of the support wall 47, are formed in the same plane, which is perpendicular to the axial direction Lc of the worm wheel 22.

Figure 12:
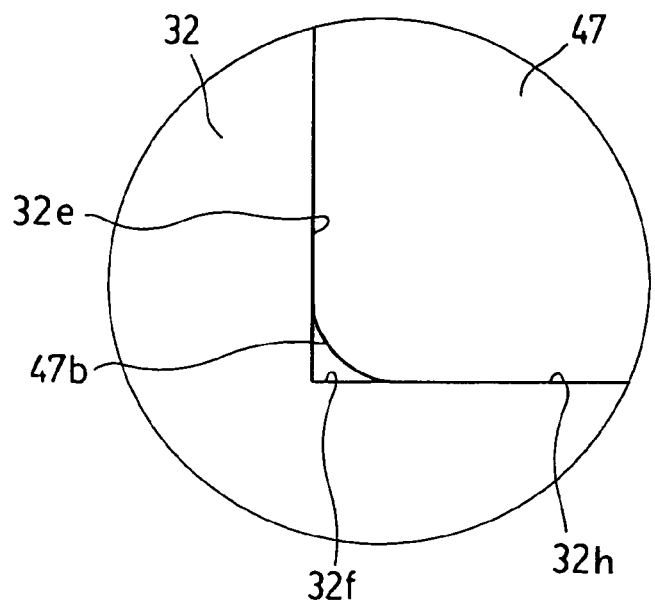
FIG. 12 is an enlarged view of an encircled portion XII in FIG. 1.
Figure 13:
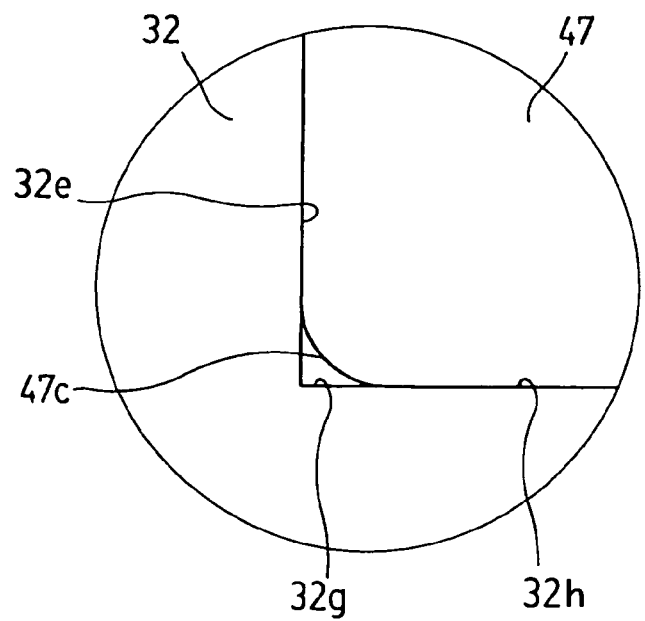
FIG. 13 is an enlarged view of an encircled portion XIII in FIG. 3.

Furthermore, as shown in FIG. 12 (an enlarged view of a circled portion XII in FIG. 1), a corner 47b of the support wall 47 is processed to have an arcuate shape to avoid interference with the corner 32f of the groove 32e. Furthermore, as shown in FIG. 13 (an enlarged view of a circled portion XIII in FIG. 3), a corner 47c of the support wall 47 is also processed to have an arcuate shape to avoid interference with a corner 32g of the groove 32e. Furthermore, the support wall 47 of the present embodiment contacts a bottom portion 32h of the groove 32e of the second gear housing part 32 to support the gear housing 30 relative to the bracket 62 in the axial direction, as described in greater detail below.

The seat drive motor 1 of the present embodiment is secured to the vehicle seat 60 by the bracket 62, as shown in FIGS. 14 and 15. That is, the gear housing 30 is secured by the screws 38 while the gear housing 30 is held by the U-shaped bracket 62, which has the opposed flat portions 62a, 62b. At this time, in the seat drive motor 1 of the present embodiment, the support wall 47 of the sensor unit 40 is engaged with the groove 32e of the second gear housing part 32 and is held between the flat portion 62a of the bracket 62 and the second gear housing part 32. The support wall 47 contacts the flat portion 62a of the bracket 62 and also contacts the bottom portion 32h of the groove 32e of the second gear housing part 32. In this way, the second gear housing part 32 is axially supported by the flat portion 62a of the bracket 62 through the support wall 47. That is, the support wall 47 supports the urging force of the gear housing 30, which is generated upon operation of the motor unit 10 to displace or flex the gear housing 30 relative to the bracket 62 in the axial direction.

Furthermore, in the state where the sensor unit 40 is installed to the second gear housing part 32, the support wall 47 is engaged with the groove 32e, and the end surface 47a of the support wall 47 is substantially flush with the end surface of the end portion 32a of the second gear housing part 32. Thus, in the seat drive motor 1 of the present embodiment, the entire second gear housing part 32 is uniformly supported by the flat portion 62a of the bracket 62 through the end portion 32a of the second gear housing part 32 and the support wall 47. As a result, at the time of driving the seat drive motor 1, even when a thrust force of the worm wheel 22 is applied to the support surface 32d of the second gear housing part 32, the thrust force can be spread between the support wall 47 and the end portion 32a. In this way, application of a localized excessive force to the second gear housing part 32 can be prevented to prevent concentration of a stress in the specific local part of the second gear housing part 32. As a result, it is possible to limit flexure and deformation of the second gear housing part 32 to extend a lifetime of the second gear housing part 32.

Furthermore, as discussed above, due to the fact that the end surface 47a of the support wall 47 and end surface 32k of the end portion 32a of the second gear housing part 32 substantially simultaneously contact the flat portion 62a of the bracket 62, the entire second gear housing part 32 is uniformly supported by the flat portion 62a of the bracket 62. Thus, the second gear housing part 32 does not need to have an extra strength. As a result, it is not required to increase the wall thickness of the second gear housing part 32. In this way, the size of the second gear housing part 32 can be reduced, and the weight of the second gear housing part 32 can be reduced. Consequently, the material costs of the second gear housing part 32 can be reduced.

Also, in the seat drive motor 1 of the present embodiment, as discussed above, the multiple ribs 35 are formed in the second gear housing part 32. Thus, the second gear housing part 32 can be supported by the flat portion 62a of the bracket 62 also through the ribs 35. As a result, in the seat drive motor 1 of the present embodiment, at the time of driving the motor 1, even when the load is applied from the worm wheel 22 to the second gear housing part 32 in a thrust direction, the thrust force can be effectively received by the support wall 47 and the ribs 35.

Furthermore, in the seat drive motor 1 of the present embodiment, as discussed above, the corner 47b of the support wall 47 has the arcuate shape, so that the corner 47b of the support wall 47 does not interfere with the corner 32f of the groove 32e (FIG. 12). Similarly, the corner 47c of the support wall 47 has the arcuate shape, so that the corner 47c of the support wall 47 does not interfere with the corner 32g of the groove 32e (FIG. 13). Thus, even when the second gear housing part 32 receives the load from the worm wheel 22 in the thrust direction, the corners 47b, 47c of the support wall 47 do not interfere with the corners 32f, 32g of the groove 32e. Therefore, it is possible to limit application of a localized excessive force to the corners 32f, 32g of the second gear housing part 32.

Next, the power seat system S, in which the seat drive motor 1 is installed, will be described with reference to FIGS. 16 and 17. The power seat system S is used in a seat of a vehicle, such as a passenger car. The power seat system S includes the lift mechanism 50, the vehicle seat 60 and the base member 70. The lift mechanism 50 vertically moves a seat cushion 61 of the vehicle seat 60 in an upward or downward direction and is installed to the base member 70. In the lift mechanism 50 of the present embodiment, the seat drive motor 1 is secured to the bracket 62. An arm 52 is formed integrally in the bracket 62.

A stationary bracket 53 is secured to the base member 70. A free end of the arm 52 is rotatably connected to an arm 54, which is formed in the stationary bracket 53, through a pin 55.

The threaded shaft 23 is received in and is threadably engaged with the shaft receiving hole 22c of the worm wheel 22 (FIG. 2). When the worm wheel 22 is rotated, the threaded shaft 23 linearly moves forward or backward in the direction of X (X1, X2) in FIG. 16. One end of the first link member 57 is rotatably connected to one end of the threaded shaft 23. A rod 58 is secured to the other end of the first link member 57. The rod 58 is rotatably arranged in the base member 70. One end of a second link member 59 is secured to the rod 58 in such a manner that a predetermined angle is formed between the first link member 57 and the second link member 59. The other end of the second link member 59 is rotatably connected to a holding bracket 51, which is secured to a bottom surface 61a of the seat cushion 61.

In the power seat system S of the present embodiment, when an operation switch (not shown) is operated, the seat drive motor 1 is rotated to rotate the worm 21. When the worm 21 is rotated, the worm wheel 22 is rotated to move the threaded shaft 23 forward or backward in the direction of X (X1, X2). When the threaded shaft 23 is moved in the direction of X1 shown in FIG. 16, the first link member 57 is pivoted about the rod 58 in a direction of R1 to pivot the second link member 59 about the rod 58 in a direction of r1. When the second link member 59 is pivoted in the direction of r1, the seat cushion 61 is lifted through the holding bracket 51. In this way, the seat cushion 61 is lifted from a position indicated by a dot-dash line to a position indicated by a solid line in FIG. 17.

Figure 17:
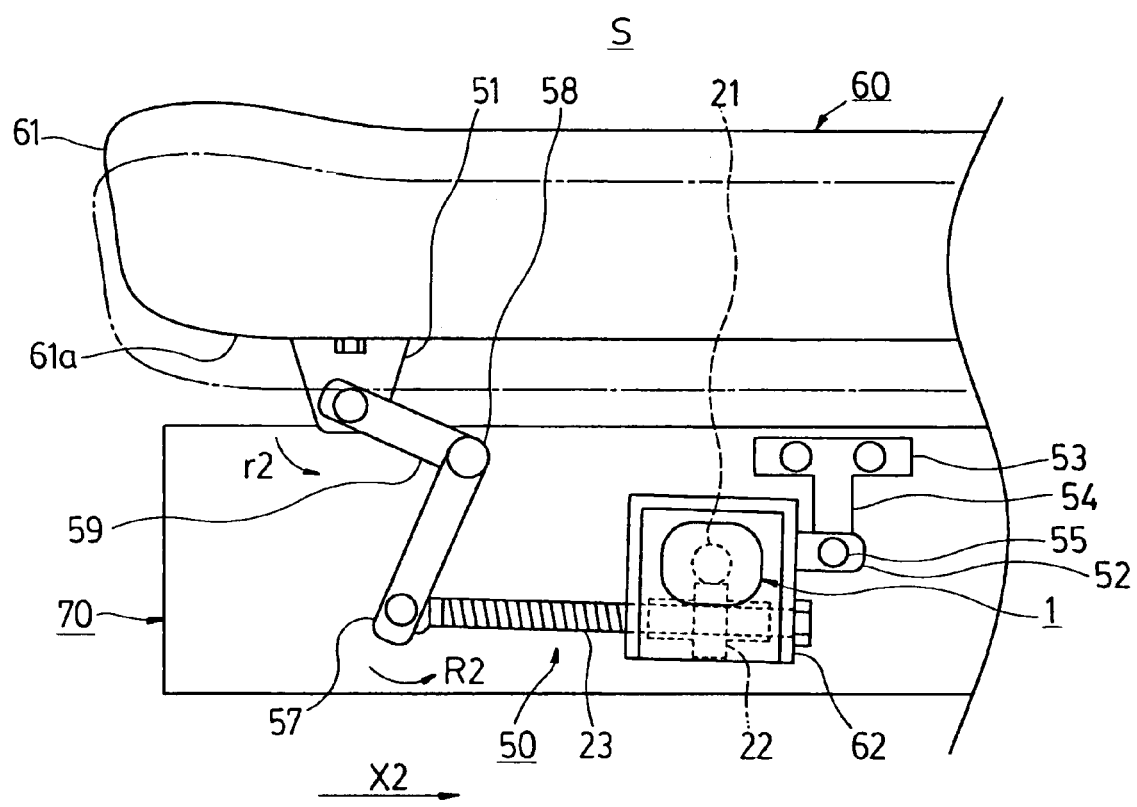
FIG. 17 is a partial schematic view of the power seat system of the present embodiment, showing two operational positions of a seat cushion of the power seat system.

In contrast, when the threaded shaft 23 is moved in the direction of X2 shown in FIG. 17, the first link member 57 is pivoted about the rod 58 in a direction of R2 to pivot the second link member 59 about the rod 58 in a direction of r2. When the second link member 59 is pivoted in the direction of r2, the seat cushion 61 is lowered through the holding bracket 51. In this way, the seat cushion 61 is lowered from the position indicated by the solid line to the position indicated by the dot-dash line in FIG. 17.

As discussed above, the present embodiment provides the following advantages.

(I) In the seat drive motor 1 of the present embodiment, due to the fact that the end surface 47a of the support wall 47 and the end portion 32a of the second gear housing part 32 substantially simultaneously contact the flat portion 62a of the bracket 62, the entire second gear housing part 32 is uniformly supported by the flat portion 62a of the bracket 62 through the end portion 32a of the second gear housing part 32 and the support wall 47. As a result, at the time of driving the seat drive motor 1, even when the thrust force of the worm wheel 22 is applied to the support surface 32d of the second gear housing part 32, the thrust force can be spread between the support wall 47 and the end portion 32a. In this way, application of the localized excessive force to the second gear housing part 32 can be prevented to prevent concentration of the stress in the specific local part of the second gear housing part 32. As a result, it is possible to limit flexure and deformation of the second gear housing part 32 to extend the lifetime of the second gear housing part 32.

(II) In the seat drive motor 1 of the present embodiment, due to the fact that the support wall 47 and the end portion 32a substantially simultaneously contact the flat portion 62a of the bracket 62, the entire second gear housing part 32 is uniformly supported by the flat portion 62a of the bracket 62. Thus, the second gear housing part 32 does not need to have the extra strength. As a result, it is not required to increase the wall thickness of the second gear housing part 32. In this way, the size of the second gear housing part 32 can be reduced, and the weight of the second gear housing part 32 can be reduced. Consequently, the material costs of the second gear housing part 32 can be reduced.

(III) In the seat drive motor 1 of the present embodiment, the corner 47b of the support wall 47 has the arcuate shape, so that the corner 47b of the support wall 47 does not interfere with the corner 32f of the groove 32e (FIG. 12). Similarly, the corner 47c of the support wall 47 has the arcuate shape, so that the corner 47c of the support wall 47 does not interfere with the corner 32g of the groove 32e (FIG. 13). Thus, even when the second gear housing part 32 receives the load from the worm wheel 22 in the thrust direction, the corners 47b, 47c of the support wall 47 do not interfere with the corners 32f, 32g of the groove 32e. Therefore, it is possible to limit application of the localized excessive force to the corners 32f, 32g of the second gear housing part 32.

(IV) In the seat drive motor 1 of the present embodiment, the support wall 47 has a sufficient strength to support the second gear housing part 32 when the support wall 47 contacts the flat portion 62a of the bracket 62. The connector terminals 45, through which the rotation measurement signal is outputted externally, are provided in the support wall 47. Therefore, the connector terminals 45 are securely fixed to the sensor unit 40. As a result, the connector terminals 45 can be reliably connected to corresponding external connector terminals. Therefore, the signal can be outputted externally from the connector terminals 45 in a stable and reliable manner.

The above embodiment can be modified in the following manner.

Figure 18:
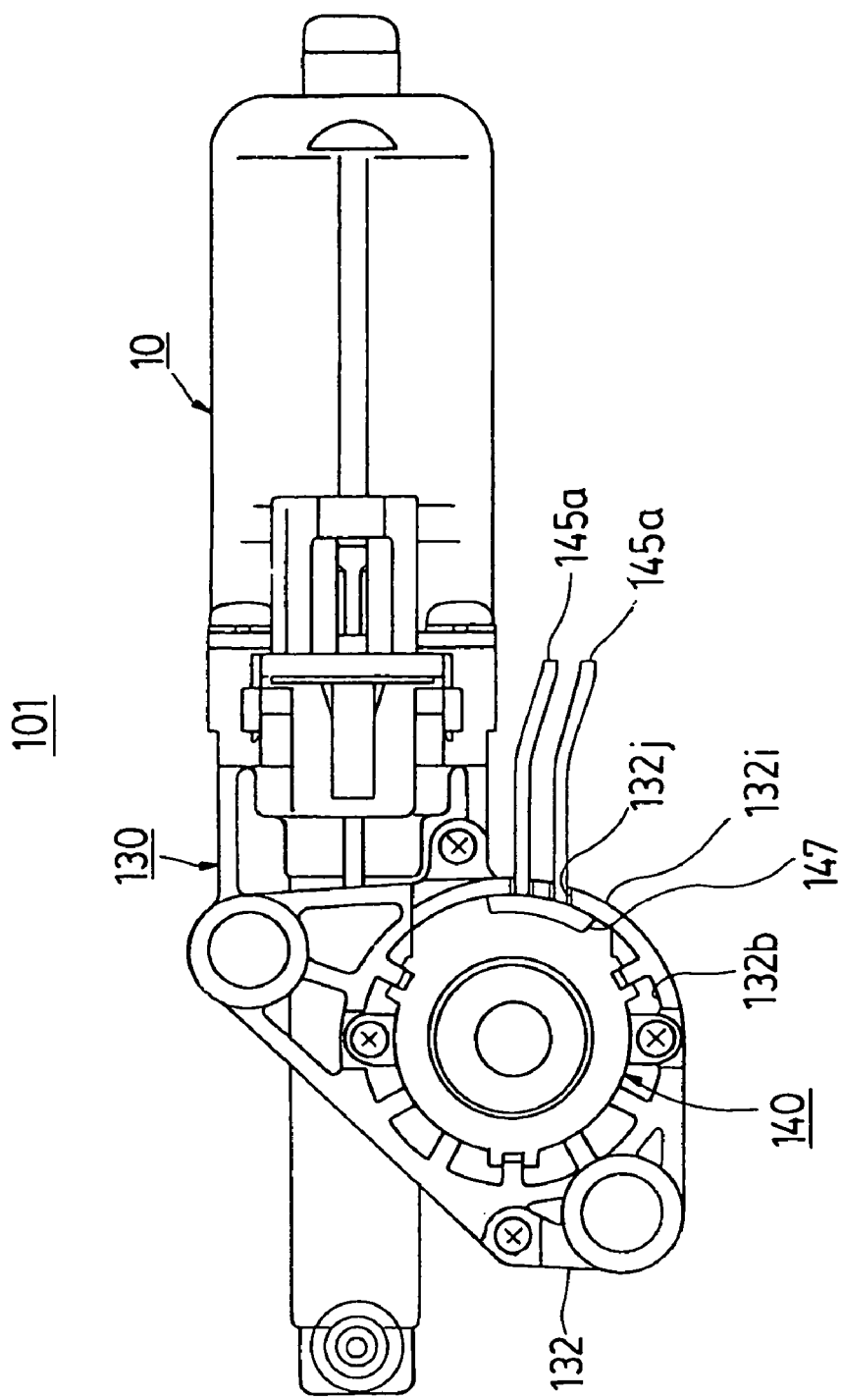
FIG. 18 is a schematic view showing a first modification of the seat drive motor.

(1) In the above embodiment, the connector terminals 45, which serve as the signal outputting means, are provided in the support wall 47. However, the present invention is not limited to this. For example, the above embodiment can be modified in a manner shown in FIG. 18. FIG. 18 shows a first modification of the above embodiment. In the first modification of the above embodiment, the structures of the seat drive motor 101 other than the structure of the second gear housing part 132 and the structure of the sensor unit 140 are the same as those of the above embodiment. Thus, in the following discussion, components, which are the same as those discussed in the above embodiment, will be indicated by the same numerals.

In the seat drive motor 101 of the first modification of the above embodiment, an outer wall 132i is formed in the second gear housing part 132 of the gear housing 130. Also, two outlet grooves 132j are arranged one after another in a rotational direction of the worm wheel 22 in the outer wall 132i. The sensor unit 140 is received in the receiving recess 132b of the second gear housing part 132. Two signal lines (signal outputting means) 145a are provided in the sensor unit 140 to output signals from the sensor unit 140. The signal lines 145a extend outwardly through the outlet grooves 132j.

A support wall 147 is formed integrally in the sensor unit 140 at radially inward of the outlet grooves 132j of the outer wall 132i. Similar to the support wall 47 of the above embodiment, the support wall 147 contacts the bracket 62 and the second gear housing part 132 and supports the gear housing 130 relative to the bracket 62 in the axial direction. The support wall 147 is formed adjacent to the outlet grooves 132j of the outer wall 132i and thus also serves as a reinforcement, which reinforces the portion of the outer wall 132i where the outlet grooves 132j are formed.

Figure 19:
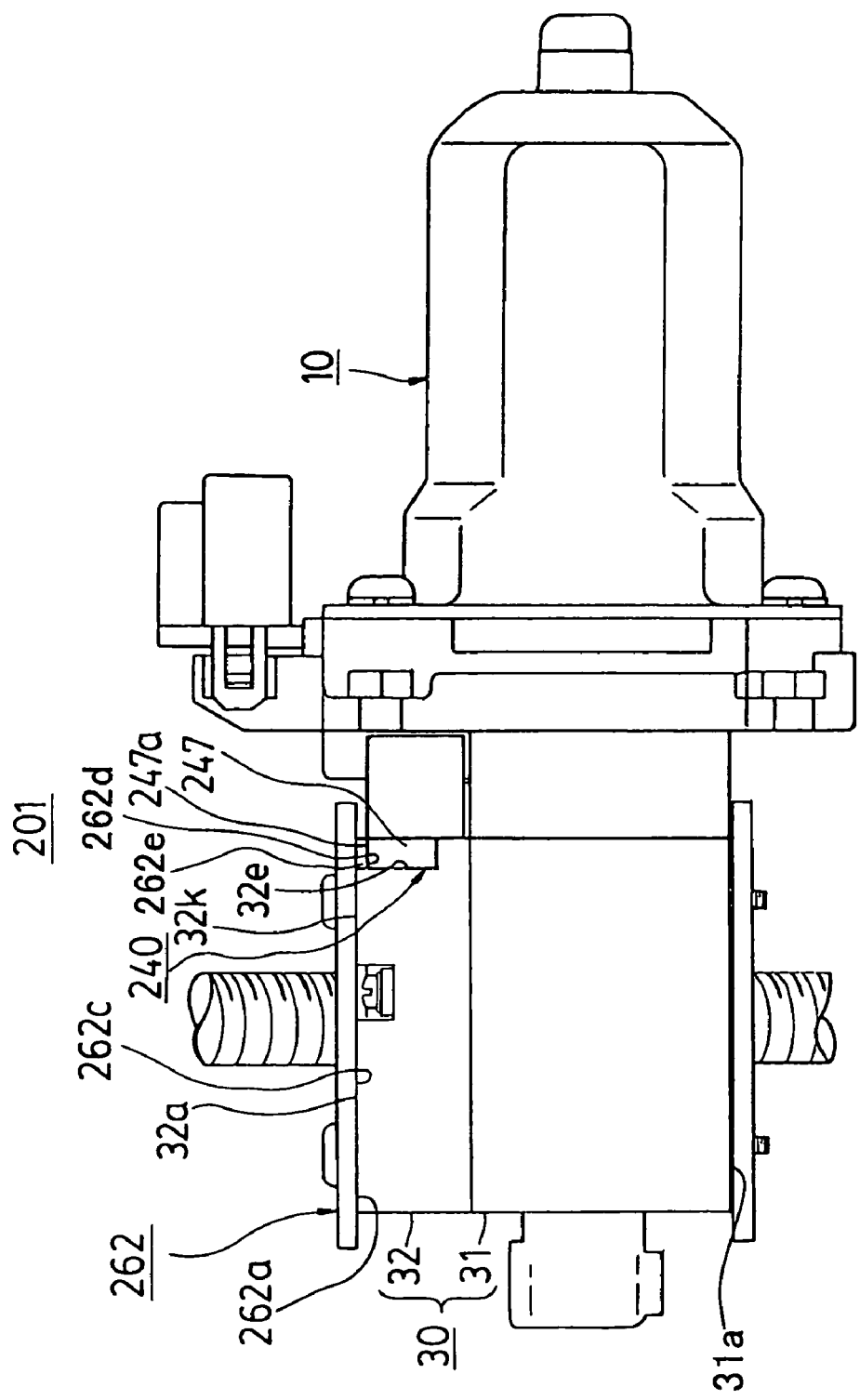
FIG. 19 is a schematic view showing a second modification of the seat drive motor.

(2) In the above embodiment, the end surface 47a of the support wall 47 is generally flush with the end surface 32k of the end portion 32a of the second gear housing part 32. Also, the end surface 32k of the end portion 32a of the second gear housing part 32 and the end surface 47a of the support wall 47 are formed in the plane, which is perpendicular to the axial direction Lc of the worm wheel 22. In this way, the end surface 32k of the end portion 32a of the second gear housing part 32 and the end surface 47a of the support wall 47 substantially simultaneously contact the flat portion 62a of the bracket 62. However, the present invention is not limited to this. For example, the above embodiment can be modified in a manner shown in FIG. 19. FIG. 19 shows a second modification of the above embodiment. In the second modification of the above embodiment, the structures of the seat drive motor 201 other than the structure of the bracket 262 and the structure of the sensor unit 240 are the same as those of the above embodiment. Thus, in the following discussion, components, which are the same as those discussed in the above embodiment, will be indicated by the same numerals.

In the seat drive motor 201 of the second modification, a projection 262e is formed in the flat portion 262a of the bracket 262 to extend toward the support wall 247. A projecting end surface 262d of the projection 262e and the end surface 247a of the support wall 247 contact each other. With this construction, the gear housing side contact surface 262c of the bracket 262, which is opposed to the end surface 32k of the second gear housing part 32, contacts the end surface 32k of the second gear housing part 32. Furthermore, the projecting end surface 262d of the projection 262e, which is opposed to the end surface 247a of the support wall 247, contacts the end surface 247a of the support wall 247. Here, the end surface (the bracket side end surface) 247a of the support wall 247 is closer to the end 31a of the first gear housing part 31 in comparison to the end surface (the bracket side end surface) 32k of the second gear housing part 32. In this modification, even when the thrust force of the worm wheel 22 (FIG. 15) is repeatedly applied to the support surface 32d of the second gear housing part 32, such a thrust force can be effectively supported.

Figure 20:
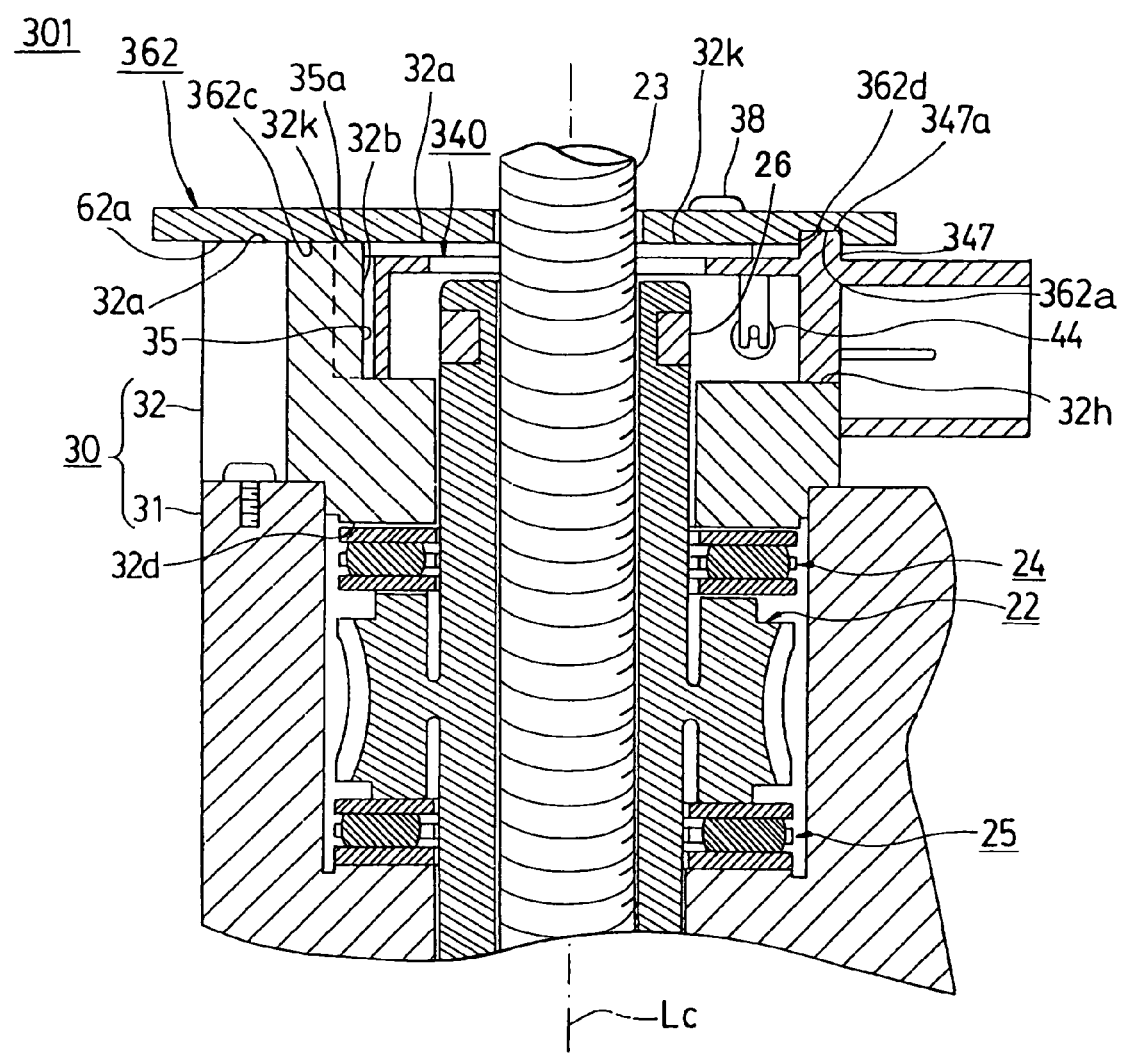
FIG. 20 is a schematic view showing a third modification of the seat drive motor.

(3) The above embodiment can be further modified. FIG. 20 shows a third modification of the above embodiment. In the third modification of the above embodiment, the structures of the seat drive motor 301 other than the structure of the bracket 362 and the structure of the sensor unit 340 are the same as those of the above embodiment. Thus, in the following discussion, components, which are the same as those discussed in the above embodiment, will be indicated by the same numerals.

In the seat drive motor 301 of the third modification, an axial recess 362d is formed in the gear housing side end surface 362c of the bracket 362. The end surface 347a of the support wall 347 is received in the recess 362d of the bracket 362. With this construction, the gear housing side end surface 362c of the bracket 262, which is opposed to the end surface 32k of the second gear housing part 32, contacts the end surface 32k of the second gear housing part 32. Furthermore, the recessed bottom surface 362a of the recess 362d, which is opposed to the end surface 347a of the support wall 347, contacts the end surface 347a of the support wall 347. Here, the end surface (the bracket side end surface) 32k of the second gear housing 32 is closer to the end 31a of the first gear housing part 31 in comparison to the end surface (the bracket side end surface) 347a of the support wall 347. In this modification, even when the thrust force of the worm wheel 22 (FIG. 15) is repeatedly applied to the support surface 32d of the second gear housing part 32, such a thrust force can be effectively supported.

(4) In the above embodiment, the support wall 47 is formed integrally with the sensor unit 40. However, the present invention is not limited to this. For example, the support wall 47 can be formed integrally in the gear housing 30. Even with this construction, when the force is applied to the gear housing 30 upon operation of the motor unit 10 to move the gear housing 30 relative to the bracket 62 in the axial direction, the urging force of the gear housing 30 can be effectively supported by the support wall 47.

(5) In the above embodiment, the linear movable member of the present invention is made from the threaded shaft 23, which has the male threads. The shaft hole 22c, which is threadably engaged with the threaded shaft 23, is formed in the worm wheel 22. However, the present invention is not limited to this. Alternatively, the linear movable member can be made of a nut that has female threads, and male threads, which are threadably engaged with female threads of the nut, can be formed in the worm wheel 22.

(6) In the above embodiment, the support portion, which supports the second gear housing part 32 relative to the flat portion 62a of the bracket 62, is formed as the wall. However, the present invention is not limited to this. Alternatively, the support portion may include a plurality of ribs or ridges.

(7) In the above embodiment, the second gear housing part 32 is supported by the bracket 62 through the support wall 47. However, the present invention is not limited to this. For example, a similar arrangement, which is similar to the support wall 47, may be used to support the first gear housing part 31 relative to the bracket 62.

In the above embodiment, the power seat system of the present invention is used in the vehicle seat. Alternatively, the power seat system of the present invention may be used in a power seat system of, for example, an airplane, a train, furniture, a massage chair.

Additional advantages and modifications will readily occur to those skilled in the art. The invention in its broader terms is therefore not limited to the specific details, representative apparatus, and illustrative examples shown and described.

What is claimed is:

1. A seat drive motor comprising:
   a bracket;
   a housing that is held by the bracket and receives a rotatable member and a linearly movable member, wherein:
   the linearly movable member is driven linearly through the rotatable member; and
   one end of the housing contacts the bracket and includes a receiving recess, which is recessed in the axial direction of the rotatable member;
   a space member that is installed in the receiving recess of the one end of the housing and includes a support portion, which is in contact with both of the housing and the bracket at opposed axial ends thereof, respectively, to support the housing relative to the bracket in the axial direction of the rotatable member;
   a motor unit that drives the rotatable member;
   the one end of the housing has a groove, which is recessed in a peripheral wall of the receiving recess in the axial direction of the rotatable member and radially extends throuah the peripheral wall of the receiving recess; and
   the support portion of the space member contacts a bottom portion of the groove of the one end of the housing.

2. The seat drive motor according to claim 1, wherein the housing is made of resin.

3. The seat drive motor according to claim 1, wherein the space member is detachably installed in the receiving recess of the one end of the housing.

4. The seat drive motor according to claim 1, wherein: the one end of the housing has a bracket side end surface, which contacts the bracket in the axial direction of the rotatable member; the support portion of the space member has a bracket side end surface, which contacts the bracket in the axial direction of the rotatable member; and the bracket side end surface of the housing and the bracket side end surface of the support portion are located in a common plane that extends perpendicular to the axial direction of the rotatable member.

5. The seat drive motor according to claim 1, wherein: the one end of the housing has a bracket side end surface, which contacts the bracket in the axial direction of the rotatable member; the support portion of the space member has a bracket side end surface, which contacts the bracket in the axial direction of the rotatable member; and the bracket side end surface of the housing is displaced from the bracket side end surface of the support portion in the axial direction of the rotatable member.

6. The seat drive motor according to claim 5, wherein the bracket side end surface of the support portion is closer to the other end of the housing, which is opposite from the one end of the housing, in comparison to the bracket side end surface of the housing.

7. The seat drive motor according to claim 5, wherein the bracket side end surface of the housing is closer to the other end of the housing, which is opposite from the one end of the housing, in comparison to the bracket side end surface of the support portion.

8. The seat drive motor according to claim 1, wherein the linearly movable member is coaxial with the rotatable member.

9. The seat drive motor according to claim 1, wherein that the housing further receives a thrust bearing member, which is axially arranged between the one end of the housing and the rotatable member.

10. The seat drive motor according to claim 1, wherein the space member has a through hole, through which the linearly movable member is received.

11. The seat drive motor according to claim 1, wherein the space member is a sensor unit, which senses rotation of the rotatable member.

12. The seat drive motor according to claim 11, wherein the sensor unit includes: a sensor element, which is arranged radially inward of the support portion of the sensor unit; and a signal outputting means for outputting a sensor signal from the sensor element, wherein the signal outputting means extends radially outward from the sensor element through the support portion of the sensor unit.

13. The seat drive motor according to claim 12, wherein: the rotatable member includes a sensor magnet, which is arranged adjacent the sensor element; and the sensor element of the sensor unit is radially positioned between the sensor magnet of the rotatable member and the support portion of the sensor unit.

14. The seat drive motor according to claim 1, wherein the seat drive motor is included in a power seat system that includes a vehicle seat that is driven by the seat drive motor.

15. A seat drive motor comprising:
   a bracket;
   a housing that is held by the bracket and receives a rotatable member and a linearly movable member, wherein:
   the linearly movable member is driven linearly through the rotatable member; and
   one end of the housing contacts the bracket and includes a receiving recess, which is recessed in the axial direction of the rotatable member;
   a space member that is installed in the receiving recess of the one end of the housing and includes a support portion, which supports the housing relative to the bracket in the axial direction of the rotatable member; and
   a motor unit that drives the rotatable member, wherein:

the one end of the housing has a groove, which is recessed in a peripheral wall of the receiving recess in the axial direction of the rotatable member and radially extends through the peripheral wall of the receiving recess; and the support portion of the space member contacts a bottom portion of the groove of the one end of the housing.

16. A seat drive motor comprising:

a bracket;

a housing that is held by the bracket and receives a rotatable member and a linearly movable member, wherein:

the linearly movable member is driven linearly through the rotatable member; and one end of the housing contacts the bracket and includes a receiving recess, which is recessed in the axial direction of the rotatable member;

a space member that is installed in the receiving recess of the one end of the housing and includes a support portion, which is in contact with both of the housing and the bracket at opposed axial ends thereof, respectively, to support the housing relative to the bracket in the axial direction of the rotatable member;

a motor unit that drives the rotatable member; and the space member has a through hole, through which the linearly movable member is received.

* * * * *